United States Patent [19]

Hatzipapafotiou

[11] Patent Number: 5,875,182
[45] Date of Patent: Feb. 23, 1999

[54] ENHANCED ACCESS BURST FOR RANDOM ACCESS CHANNELS IN TDMA MOBILE SATELLITE SYSTEM

[75] Inventor: Dimitrios Hatzipapafotiou, Newtown Square, Pa.

[73] Assignee: Lockheed Martin Corporation, King of Prussia, Pa.

[21] Appl. No.: 784,873

[22] Filed: Jan. 16, 1997

[51] Int. Cl.⁶ .................................................. H04B 7/212
[52] U.S. Cl. ............................................ 370/321; 370/350
[58] Field of Search ...................................... 370/316, 319, 370/321, 322, 323, 324, 326, 328, 336, 337, 339, 345, 347, 348, 349, 350; 455/427, 428, 430, 431

[56] References Cited

U.S. PATENT DOCUMENTS

| | | | |
|---|---|---|---|
| 4,262,356 | 4/1981 | Lautier et al. ............................ | 370/323 |
| 5,594,780 | 1/1997 | Wiedeman et al. ....................... | 455/430 |
| 5,659,545 | 8/1997 | Sowles et al. ............................ | 370/324 |
| 5,661,724 | 8/1997 | Chennakeshu et al. ................. | 370/324 |
| 5,663,958 | 9/1997 | Ward ........................................ | 370/347 |
| 5,717,686 | 2/1998 | Schiavoni ................................. | 370/321 |

*Primary Examiner*—Chi H. Pham
*Assistant Examiner*—Kwang B. Yao
*Attorney, Agent, or Firm*—W. H. Meise; S. A. Young

[57] ABSTRACT

A spacecraft (12) cellular TDMA communications system (10) includes many user terminals (16), some of which may be movable. The spacecraft repeats transmissions by way of spot beams (20). A user initiates communication by synchronizing to the TDMA slots (210, 212), and transmits an access request signal. The access request signal is transmitted in at least two slots. The first slot contains time and frequency PN synch information, and the second slot contains one of (a) the user terminal's ID code and (b) a code representing the desired type of access. After this message is transmitted and received, the user terminal may transmit the PN synch information on a third slot, followed by the other one of the user terminal's ID code and the access-representative code.

10 Claims, 2 Drawing Sheets

ENHANCED ACCESS BURST FOR RANDOM ACCESS CHANNELS IN TDMA MOBILE SATELLITE SYSTEM

FIELD OF THE INVENTION

This invention relates to cellular communications systems, and more particularly to such systems which provide coverage between terrestrial terminals in a region by way of a spacecraft, where some of the terrestrial terminals may be mobile terminals, and some may be gateways which link the cellular system with a terrestrial network such as a public switched telephone network (PSTN).

BACKGROUND OF THE INVENTION

Mobile cellular communication systems have become of increasing importance, providing mobile users the security of being able to seek aid in case of trouble, allowing dispatching of delivery and other vehicles with little wasted time, and the like. Present cellular communication systems use terrestrial transmitters, such as base stations, fixed sites or towers, to define each cell of the system, so that the extent of a particular cellular communication system is limited by the region over which the base stations are distributed. Many parts of the world are relatively inaccessible, or, as in the case of the ocean, do not lend themselves to location of a plurality of dispersed cellular sites. In these regions of the world, spacecraft-based communication systems may be preferable to terrestrial-based systems. It is desirable that a spacecraft cellular communications system adhere, insofar as possible, to the standards which are common to terrestrial systems, and in particular to such systems as the GLOBAL SYSTEM FOR MOBILE COMMUNICATIONS system (GSM), which is in use in Europe.

The GSM system is a cellular communications system which communicates with user terminals by means of electromagnetic transmissions from, and receptions of such electromagnetic signals at, base stations, fixed sites or towers spaced across the countryside. The term "user terminal" for purposes of this patent application includes mobile user terminals, and also includes hand-held and fixed user terminals, but not gateways. The GSM system is described in detail in the text The GSM System for Mobile Communications, subtitled *A Comprehensive Overview of the European Digital Cellular System*, authored by Michel Mouly and Marie-Bernadette Pautet, and published in 1992 by the authors, at 4, rue Elisée Reclus, F-91120 Palaiseau, France. Each base station of the GSM system includes transmitter and receiver arrangements, and communicates with user terminals by way of signals in a bandwidth of 50 MHz, around 900 Mhz., and also by way of signals having a bandwidth of 150 Mhz around 1800 Mhz.

A cellular communication system should provide a channel for allowing a user terminal to initiate communications with the overall network. Each base station, fixed site, or tower continually transmits network synchronization information (SCH) and network-specific information (BCCH), which a user terminal uses to synchronize to the appropriate network at initial turn-on of the user terminal. The GSM system provides a channel denominated "Random Access Channel" or RACH. In GSM, the RACH channel is used for initial synchronization of the network to the user terminal. To implement the RACH, the user terminal sends to the base station an "access burst," which includes a finite duration modulated carrier, transmitted in one TDMA time slot, carrying information. In the GSM terrestrial system, the burst includes eight beginning tail bits, forty-one synchronization bits, thirty-six coded data bits, and three ending tail bits. In GSM, the slot duration is 156.25 bits long, so the access burst has 68.25 bits of guard time. The thirty-six coded data bits allow coding, using R=1/2, K=5 convolutional code, of a group of eight bits of information, six bits of cyclic redundancy code (CRC) for error detection (modulo-2 added to BSIC), and four bits of decoder trellis termination. Analysis has disclosed that, in a spacecraft mobile cellular system, synchronization may be inadequate using the GSM scheme, and the system may as a consequence be unreliable. Improved spacecraft cellular communications systems are desired.

SUMMARY OF THE INVENTION

A spacecraft TDMA cellular communications system provides communication of traffic signals and communication system control signals between disparate terrestrial locations by way of successive temporally-interleaved signal bursts. The cellular communications system includes a spacecraft, which in turn includes transmitters and receivers, and an antenna arrangement coupled to the transmitters and receivers, for forming a plurality of spot beams, each of which defines a footprint on the surface of the Earth below. The spacecraft is functionally equivalent to a "bent pipe," in that it does not process the information which it retransmits, although it may convert frequency, and route signals to spot beams depending upon the RF frequency of the carrier. In saying that the spacecraft does not process the information means not demodulating and remodulating the information carrier, although the carrier frequency may be converted, as mentioned above. The footprints of the spot beams may partially overlap each other, to provide continuous coverage. At least one terrestrial network control center, which is preferably co-located with one gateway terrestrial terminal, is located in one of the footprints. Each of the gateway terrestrial terminal(s) is coupled to a terrestrial communications system, such as a land telephone system, for coupling the terrestrial communications system with the spacecraft communications system. Each gateway terrestrial terminal is capable of transmitting electromagnetic signals to the spacecraft, and of receiving electromagnetic signals from the spacecraft. The cellular communications system also includes a plurality of user terrestrial terminals, which may be fixed or mobile stations. At least some of the user terrestrial terminals are located in the footprints. Each of the user terrestrial terminals is capable of transmitting electromagnetic signals to the spacecraft, and of receiving electromagnetic signals from the spacecraft. Each of the user (subscriber) terrestrial terminals includes an access request signal generator, for generating access request signals at the time of inception of a communication by the user terrestrial terminal, and for transmitting the access request signals by way of the electromagnetic signals to a network control center or to a selected one of the gateway terrestrial terminals. In a particular embodiment of the invention, the spacecraft includes frequency converters for converting the carrier frequency of the access request signals from the original band to another band, so that the access request is routed to the appropriate frequency band. Each of the access request signals includes time and frequency synchronization components, and also includes information components. The time and frequency synchronization components of the access request signals are transmitted on a first burst of the TDMA, and the information components of the access request signals are transmitted on at least a second burst of the TDMA, which occurs later in time than the first burst.

In a particular embodiment of the invention, the information components of the access request signals include at least a "user terminal identification" component or a "requested function" component, and may contain both. The "requested function" component of the information components of the access request signals may include a telephone number to which communication is desired from the user terrestrial terminal. The second burst transmitted from the user terrestrial terminal is separated from the first burst transmitted from the user terrestrial terminal by a time equal to an integer multiple, including the integer zero, of the duration of one TDMA slot. The integer multiple may be zero, so that the second slot follows the first slot, without an intervening slot. The time and frequency synchronization components may include a pseudorandom sequence. The information component of the access request signal may include error detection andor error detection and correction (EDAC) coding, and may also include interleaving.

DESCRIPTION OF THE INVENTION

Figure 1:
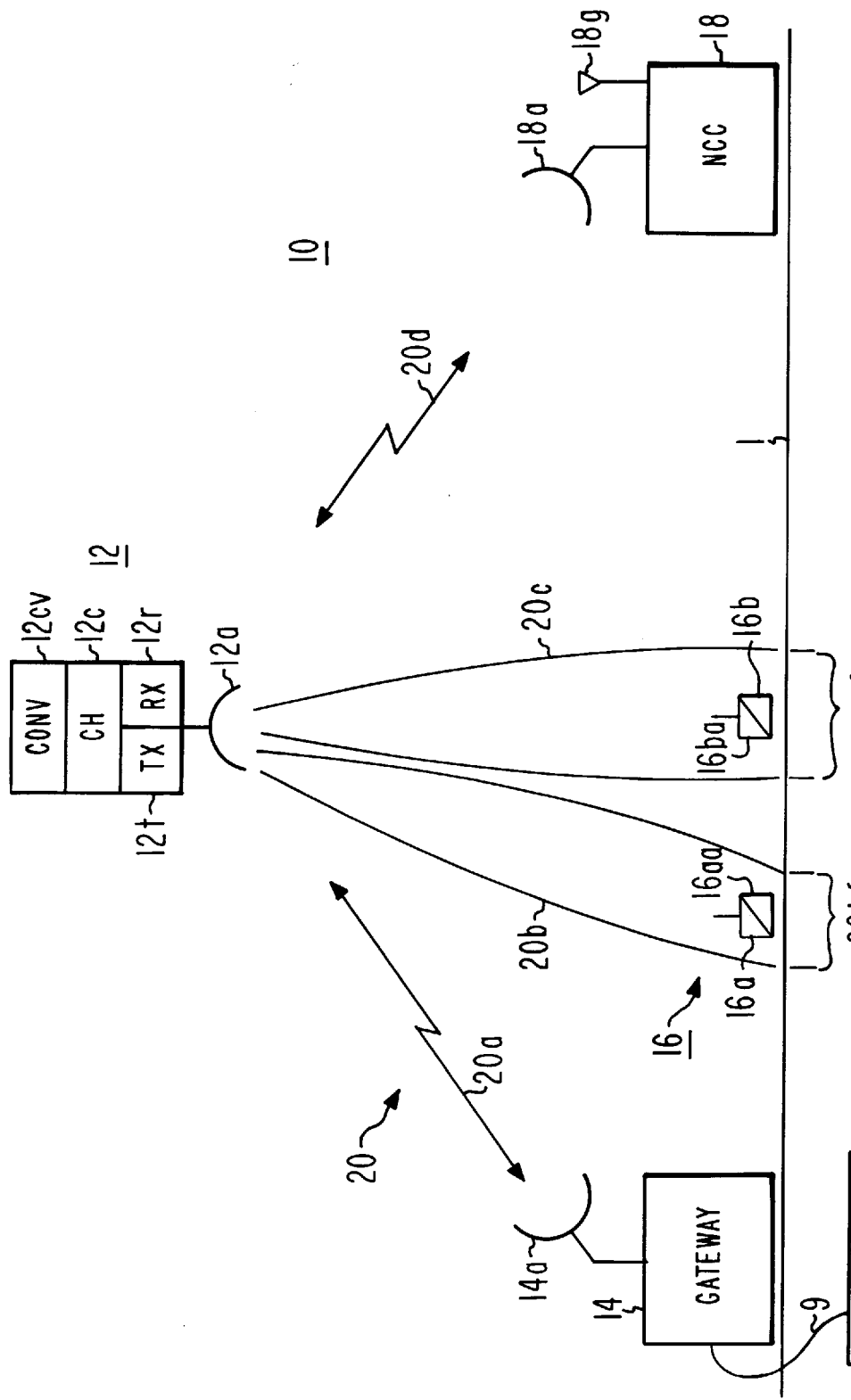
FIG. 1 is a simplified diagram of a spacecraft cellular communications system in accordance with an aspect of the invention.

FIG. 1 is a simplified block diagram of a spacecraft or satellite cellular communications system 10. In system 10, a spacecraft 12 includes a transmitter (TX) 12t, a receiver (RX) 12r, and a frequency-dependent channelizer 12c, which routes bands of frequencies from the receiver 12r to the transmitter 12t. Spacecraft 12 also includes an array of frequency converters 12cv, which convert the uplink frequency to an appropriate downlink frequency. Antenna 12a generates a plurality 20 of spot beams, one or more spot beams for each frequency band. Some of the spot beams are illustrated as 20a, 20b, 20c, and 20d. Each spot beam 20x (where x represents any subscript) defines a footprint on the earth 1 below. Two of the spot beams are illustrated as 20bf and 20cf. It will be understood that those spot beams which are illustrated in "lightning bolt" form also produce footprints. As is known to those skilled in the art, the footprints of spot beams from a spacecraft may overlap, to provide continuous coverage of the terrestrial region covered by the spot beams.

As illustrated in FIG. 1, a group 16 of mobile terrestrial user terminals or stations includes at least two user terminals, denominated 16a and 16b, each of which is illustrated as having an upstanding whip antenna. User terminal 16a lies within the footprint 20bf, and user terminal 16b lies within footprint 20cf. User terminals 16a and 16b provide communications service to users, as described below. Each user terminal 16a and 16b is illustrated as including an access signal generator 16aa and 16ab, respectively. FIG. 1 also illustrates a terrestrial gateway terminal (fixed site, tower, or station) 14, which lies in a footprint (not designated) of spot beam 20a. Gateway terminal 14 communicates with spacecraft 12 by way of electromagnetic signals transmitted from an antenna 14a, and receives signals from the spacecraft by way of the same antenna. Gateway terminal 14 provides communication between spacecraft cellular communications system 10 and a landline network illustrated as a block 8. While a single gateway 14 is illustrated, the system 10 may contain many gateways at spaced-apart locations.

A network control center (NCC)18 in FIG. 1 is a terrestrial terminal which includes an antenna 18a for communication with the spacecraft, and by way of the spacecraft to the user terminals 16 and the gateway(s) 14. NCC 18 also includes a GPS receiving antenna 18g for receiving global positioning time signals, to provide position information and an accurate time clock. The network control center performs the synchronization and TDMA control which the spacecraft cellular communications network requires. While there may be a plurality of such NCCs throughout the system, adapted for providing control for particular sets of channels of the system, the usual system will contain one NCC. While NCC 18 is illustrated as being separate from gateway 14, those skilled in the art will recognize that the NCC includes functions, such as the antenna, which are duplicated in the gateway 14, and it makes economic sense to place the Ncc(s) at the sites of the gateway(s), so as to reduce the overall system cost by taking advantage of the redundancies to eliminate expensive subsystems.

The spacecraft 12 of FIG. 1 may need to produce many spot beams 16, and the transmissions over the spot beams may require substantial electrical power, at least in part because of the low gain of the antennas of the user terminals 16. In order to reduce the power required by the transmitters in the spacecraft, the downlink frequencies (the frequencies used for transmissions from the spacecraft to terrestrial user terminals) are within a relatively low frequency band, to take advantage of the increased component efficiencies at the lower frequencies. The user terminals transmit to the spacecraft at the lower frequencies, because of their limited power capability, and because of their relatively low antenna gain. The transmissions from the spacecraft to and from the gateways may be within a higher frequency band, because of FCC frequency allocation considerations. The reduced power requirements, in turn, allows the spacecraft to operate with a smaller solar panel power system than would otherwise be required, which is very advantageous from the point of view of propellant load, in that more propellant can be carried, and the operational lifetime of the spacecraft may be longer. In a specific embodiment of the invention, the uplinks and downlinks of the gateways (to the satellite) may be at C-band, while the uplinks and downlinks of the user terminals (to the spacecraft) are at L-band. The combination of a portable power source such as a battery, and a small and therefore inefficient antenna, together with the possibility that the user terminal may be located within a building or other structure, reduce the effective radiated power (ERP) when the user terminal transmits. At the time of inception of communication, before synchronization is fully established, the relatively low ERP reduces the energy arriving at the spacecraft, and also reduces the energy available at the network control center of the gateway for synchronizing frequency and time when receiving signals representing requests for access to the cellular communications system 10 originating from user terminals using the GSM system. The limited amount of synchronization energy may result in unreliable communications, and failure to recognize the request for access.

Figure 2:
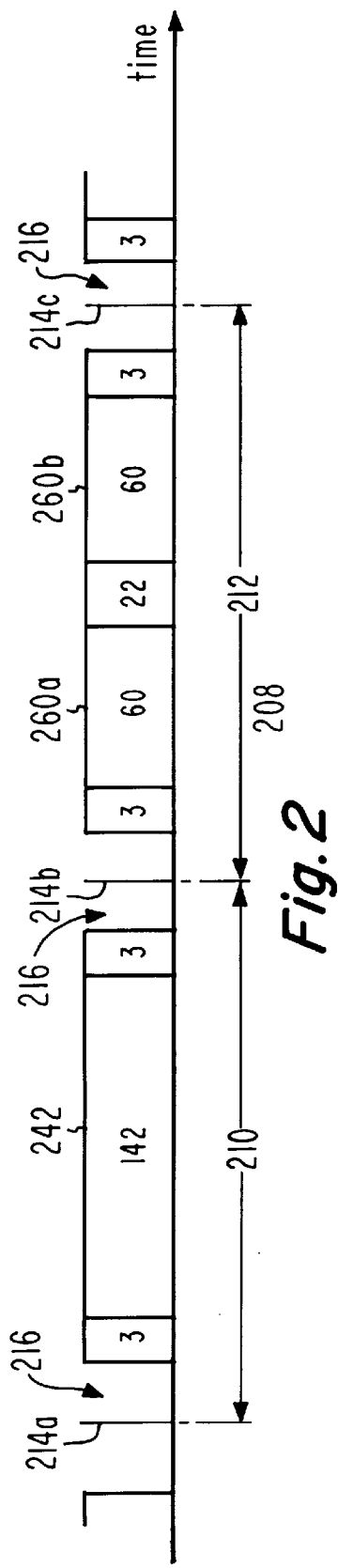
FIG. 2 is a simplified amplitude-time plot of an access request signal, according to an aspect of the invention, which is transmitted on a spacecraft random access channel.

FIG. 2 is an amplitude-time plot or line which represents the content of a plurality of time-division multiple access (TDMA) slots during the inception of transmissions by a terrestrial user terminal. Before reaching the point illustrated in FIG. 2, the terrestrial user terminal 16x of FIG. 1 must receive signals arriving at its location, and scan the signals so received in order to determine which spot beams are available in its location, and to synchronize itself to the cellular communications system 10. Once the user terminal 16x which wishes to initiate service on the network is synchronized with the network, it transmits information on a system random access channel (S-RACH) as illustrated in FIG. 2, so that the network can synchronize to the user terminal in time and frequency.

In FIG. 2, a first complete TDMA time slot is illustrated as 210, and a second complete TDMA time slot, immediately following time slot is illustrated as 212. The TDMA slot boundaries are illustrated as 214a, 214b, 214c .... Each slot boundary 214x is preceded and followed by a guard time, some of which are illustrated as 216. Within first time slot 210, a carrier with a duration of 148 bits is modulated by a 142-bit pseudorandom sequence 242, preceded and followed by three-bit tail sequences. First time slot 210 does not include any information, but its PN sequence is used only for time and frequency synchronization. In this, the system according to the invention differs from the GSM standards. Use of the entire first time slot for synchronization allows transmission of more synchronization energy than might otherwise be the case, while retaining the GSM-standard time slot structure. This additional energy allows the receiver to synchronize itself in the presence of the Doppler shift occasioned by the motion of the spacecraft. A following time slot, illustrated in FIG. 2 as being the next following time slot 212, contains information and additional time synchronization information.

Second time slot 212 of FIG. 2 extends from boundary 214b to boundary 214c, and is also has a duration of 148 bits, plus two guard band 216 intervals. The information contained in slot 212 includes a three-bit tail, followed by a sixty-bit interval 260a, a twenty-two bit time synchronization interval 222, a further sixty-bit interval 260b, and a further three-bit tail. The time synchronization interval 222 is placed in the center of the slot interval, to provide symmetry, and it carries a pseudorandom code. The two sixty-bit portions 260a and 260b together provide information-carrying capacity for twenty-eight bits of raw information. The twenty-eight bits of raw data or information are encoded with six CRC bits, and a further six bits are added for trellis termination code, for a total of forty bits. The forty bits so coded are then subject to R=1/3, K=7 convolutional coding, which results in tripling the total number of bits to one hundred and twenty, precisely the number of bits available to be carried in data portions 260a and 260b taken as a whole. The R=1/3, K=7 code helps in overcoming the weak channel performance, and thereby aid in providing reliable communications. The one-hundred-and-twenty encoded bits may be interleaved with a block interleaving scheme for further protection against channel impairment. The twenty-eight bits of raw data may be either the identification of the user terminal or the action desired by the user terminal. In one embodiment of the invention, the action desired is identified by a telephone number, which by implication requests communication with that particular number. The user terminal identification can presumably be carried on one twenty-eight bit burst, but the identity of terminal to be communicated with (as, for example, a telephone number, including country codes and city codes) may require more than twenty-eight raw bits. If the information to be conveyed exceeds twenty-eight bits, it may be split into two or more portions for transmission on a plurality of sequential (as to this user terminal) slots. The user terminal identification code is used by the cellular system 10 to identify the particular terminal which is requesting service, and to verify that the user is authorized to request service. Following the transmission of signals in time slots 210 and 212 of FIG. 2, the user terminal waits for acknowledgment of its access request. Since the user terminal which has just transmitted its own bursts 210 and 212 must now wait, the S-RACH channel is available for other user terminals to transmit their own access request codes.

It should be emphasized that, while the information contained in a bursts 260a, 260b of a particular slot may be the user terminal identification code, and the information in the corresponding bursts 260a, 260b of the next slot may be the requested function or type of access, the information carried in the two successive transmissions may be reversed, so that the user terminal identification follows the requested access information.

The requested function signal transmitted from the user terminal is routed by way of the spacecraft to the network control center. The network control center uses the requested telephone number (or other request) to identify which of the gateway terminals should handle the particular user. Thus, in the case of a user terminal seeking connection to a telephone on an island served by only one gateway terminal, it would not be useful to route the mobile user's call to any other gateway, because those other gateways could not provide the desired connection. The network control center "hands off" the user terminal's call to the appropriate one of the gateway terrestrial terminals, depending upon the initial numbers (the country code and possibly the city code) of the telephone number. The remaining portions of the telephone number to be accessed are, in general, only of interest to the gateway which must make the actual connection.

Figure 3:
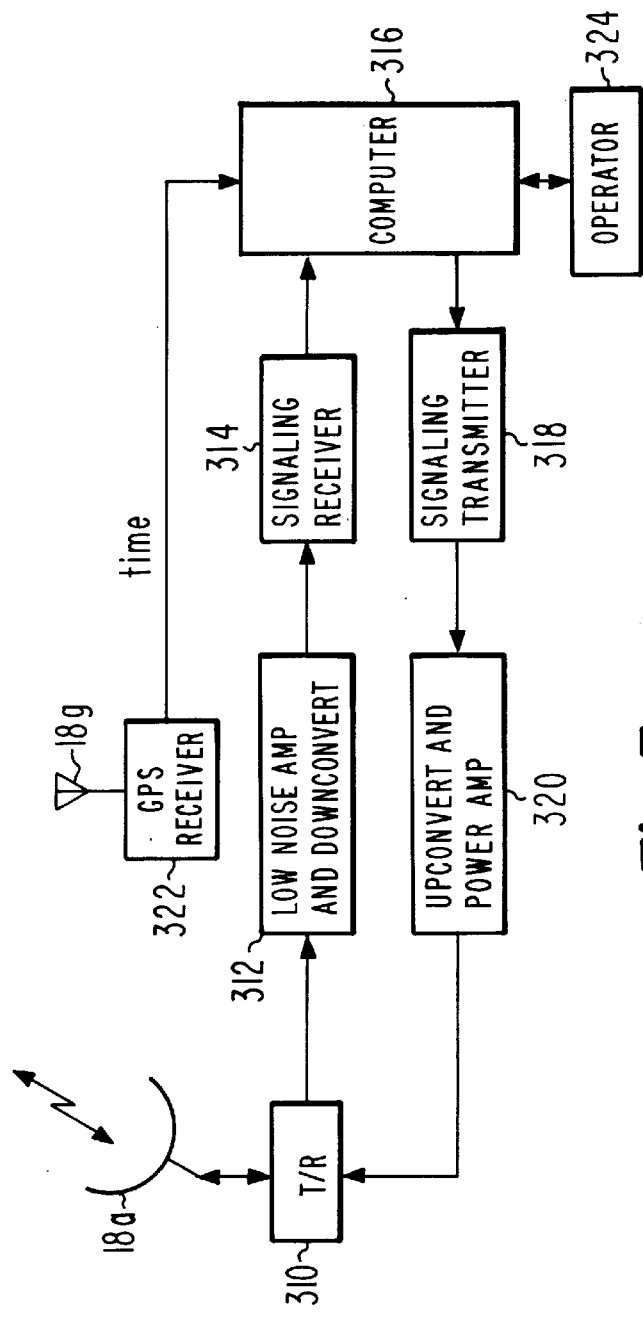
FIG. 3 is a simplified block diagram of a network control center in accordance with an aspect of the invention.

The access request information is transmitted by way of the S-RACH channel from the user terminal desiring access to a network control center (NCC), such as network control center 18 of FIG. 1. The network control center is illustrated in more detail in FIG. 3. In FIG. 3, antenna 18a is coupled to a transmit/receive (T/R) device 310, which may be a simple frequency-splitting filter. An output port of T/R 310 is coupled to a low noise amplifier and downconverter, illustrated together as a block 312. The amplified, down-converted signals are applied from block 312 to a further signaling receiver block 314, which represents reception of control signals, such as access control signals from the S-RACH channel. The control signals are then applied to a processor or computer 316. Computer 316 also receives time signals from a global positioning signal receiver 322. Computer 316 processes the time signals and the control signals which it receives, to produce commands for operation of the cellular communications system. These signals may include commands for utilizing resources. In relation to the access request signals, the computer informs the user terminal in which direction, and in what amount, of time adjustment, required to synchronize the user terminal to the network. It may also compare the user identity with a log to validate the user, read the telephone number to which a user wishes to be connected, and to determine to which of many gateway terminals the call should be assigned. The signals generated by computer 316 are routed to a signaling transmitter 318, which encodes the signals, and applies them to an upconverter and power amplifier, illustrated together as a block 320. The upconverted, amplified signals are applied to T/R device 310 for application to antenna 18a. From antenna 18a, the signals are sent to the spacecraft, to be distributed, in accordance with frequency, to the various spot beams, all as described above.

Thus, in general, a spacecraft (12) cellular TDMA communications system (10) includes many user terminals (16), some of which may be movable, as in mobile or portable.

The spacecraft repeats transmissions by way of spot beams (20). A user terminal initiates communication by synchronizing to the TDMA slots (210, 212), and then transmits an access request signal. The access request signal is transmitted in at least two slots. The first slot contains time and frequency PN synch information, and the second slot contains one of (a) the user terminal's ID code and (b) a code representing the desired type of access. After this message is transmitted and received, the user terminal may transmit the PN synch information on a third slot, followed by the other one of the user terminal's ID code and the access-representative code.

Thus, a spacecraft TDMA cellular communications system (10) according to an aspect of the invention provides communication of traffic signals and communications system (10) control signals between disparate terrestrial locations by way of successive temporally-interleaved TDMA signal bursts. The spacecraft (12) includes transmitters (12t) and receivers (12r), and an antenna arrangement (12a, 12c) coupled to the transmitters (12t) and receivers (12r), for forming a plurality of spot beams (20), each of which spot beams (20) defines a footprint (20bf, 20cf) on the surface of the Earth below. The footprints (20bf, 20cf) of the spot beams (20) may partially overlap each other, to provide continuous coverage. At least one network control system (18) is located in one of the footprints. The network control center (18) may be located at a gateway terrestrial station (14). Each of the gateway terrestrial terminal(s) (14) is coupled to a terrestrial communications system (8), such as a land telephone system or public switched telephone system (8) (PSTN), for coupling the terrestrial communications system (8) with the spacecraft communications system (10). Each NCC (18), and gateway terrestrial terminal (14), is capable of transmitting electromagnetic signals to the spacecraft (12), and of receiving electromagnetic signals from the spacecraft. The cellular communications system (10) also includes a plurality (16) of user terrestrial terminals, which may be fixed or mobile stations. At least some of the user terrestrial terminals (16a, 16b) are located in the footprints (20bf, 20cf) on the underlying ground (1). Each of the user terrestrial terminals (16a, 16b) is capable of transmitting electromagnetic signals to the spacecraft, and of receiving electromagnetic signals from the spacecraft. Each of the user terrestrial terminals (16a, 16b) includes an access request signal generator (16aa, 16ba), for generating access request signals (210) at the time of inception of a communication by the user terrestrial terminal (16a, 16b), and for transmitting the access request signals (208) by way of the electromagnetic signals to a selected one of the terrestrial terminals (18). In a particular embodiment of the invention, the spacecraft (12) includes frequency converters (12cv) for converting the carrier frequency of the access request signals from the original band, so that each access request is routed to the appropriate frequency band. Each of the access request signals (208) includes time and frequency synchronization component(s) (242, 222) and, also includes information components (260a, 260b). The time and frequency synchronization component(s) (242, 222) of the access request signals (208) are transmitted on a first burst (210) of the TDMA, and the information components (260a, 260b) of the access request signals (208) is or are transmitted on at least a second burst (212) of the TDMA, which occurs later in time than the first burst (210).

In a particular embodiment of the invention, the information components (260a, 260b) of the access request signals (208) include at least a user terminal identification component or a requested-function component, and may contain both. The requested-function component of the information components of the access request signals may include a telephone number to which communication is desired from the user terrestrial terminal. The second burst transmitted from the user terrestrial terminal is separated from the first burst transmitted from the user terrestrial terminal by a time equal to an integer multiple, including the integer zero, of the duration of one TDMA slot. The integer multiple may be zero, so that the second slot follows the first slot, without an intervening slot. The time and frequency synchronization components may include a pseudorandom sequence. The information component of the access request signal may include error detection andor error detection and correction (EDAC) coding. It may also include interleaving.

Other embodiments of the invention will be apparent to those skilled in the art. For example, while network 8 has been described as a land-line network, it may include spacecraft or terrestrial light or microwave links.

What is claimed is:

1. A spacecraft TDMA cellular communications system, for communicating traffic signals between disparate terrestrial locations by way of successive temporally-interleaved signal bursts, said system comprising:

a spacecraft including transmitting and receiving means, and an antenna arrangement coupled to said transmitting and receiving means, for forming a plurality of spot beams, each of which defines a footprint, which footprints of said spot beams may partially overlap;

at least one network control center located in one of said footprints, for transmitting electromagnetic control signals to said spacecraft, and for receiving electromagnetic control signals from said spacecraft, for controlling the timing of said temporal bursts;

at least one gateway terrestrial terminal located in one of said footprints, each one of said at least one gateway terrestrial terminal being coupled to a terrestrial communications system, for coupling said terrestrial communications system with said spacecraft communications system, said gateway terrestrial terminal being for transmitting electromagnetic traffic signals to said spacecraft, and for receiving electromagnetic traffic signals from said spacecraft;

a plurality of user terrestrial terminals, at least some of said user terrestrial terminals being located in said footprints, each of said user terrestrial terminals being for transmitting electromagnetic signals to said spacecraft, and for receiving electromagnetic signals from said spacecraft, each of said user terrestrial terminals including access request signal generating means for generating access request signals at the inception of a communication by said user terrestrial terminal, and for transmitting said access request signals by way of said electromagnetic signals to a selected a least one of said network control center each of said access request signals including time and frequency synchronization components and also including information components, said synchronization component of said access request signals being transmitted on a first burst of said TDMA, and said information component of said access request signals being transmitted on at least a second burst of said TDMA, later in time than said first burst.

2. A system according to claim 1, wherein said information components of said access request signals include at least one of a user terminal identification component and a requested function component.

3. A system according to claim 2, wherein said requested function component of said information components of said access request signals includes a telephone number to be which communication is desired from said user terrestrial terminal.

4. A system according to claim 1, wherein said second burst transmitted from said user terrestrial terminal is separated from said first burst transmitted from said user terrestrial terminal by a time equal to an integer multiple, including the integer zero, of TDMA slots.

5. A system according to claim 4, wherein said integer multiple is zero.

6. A system according to claim 1, wherein said time and frequency synchronization components comprise a pseudorandom sequence.

7. A system according to claim 1, wherein said information component of said access request signal include error correction coding.

8. A method for operating a spacecraft TDMA communications system which provides communication of traffic signals between and among disparate terrestrial locations by successive interleaved temporally-interleaved bursts, said method comprising the steps of:

at a user terrestrial terminal, transmitting electromagnetic signals to said spacecraft within slots of said TDMA, and receiving electromagnetic signals within slots of said TDMA from said spacecraft, by way of a spot beam;

at said spacecraft, repeating at least the information content of said electromagnetic signals in the form of transmissions toward other terrestrial terminals;

at said user terrestrial terminal, at a synchronization time occurring near the time of inception of each transmission, including time and frequency components of access request signals within a first one of a succession of time-separated slots of said TDMA within said electromagnetic signals transmitted to said spacecraft;

at said user terrestrial terminal, at a time later than said synchronization time, including information components of said access request signals within a later one of said succession of time-separated slots of said TDMA within said electromagnetic signals transmitted to said spacecraft, whereby said spacecraft repeats said information toward other ones of said terrestrial terminal;

at a network control center terrestrial terminal, receiving said synchronizing components of said access request signals from said spacecraft on said first one of said slots, and using said synchronizing components to perform time and frequency synchronization for reception of said access request signals, and receiving said information components of said access request signals using at least said frequency synchronization derived from said first one of said slots.

9. A method according to claim 8, wherein said user terrestrial terminal transmits within said information component one of (a) an identification code unique to said user terrestrial terminal, and (b) a code representing a request for a particular communication.

10. A method according to claim 9, wherein said code representing a request for a particular communication is in the form of a telephone number to be accessed; and said network control center interprets said code as a request for communication between said user terrestrial terminal and the specified telephone number, determines which one of a plurality of gateway terrestrial terminals should route the desired communication, and hands off control of said user terrestrial terminal to the selected one of said gateway terrestrial terminals.

* * * * *